United States Patent
Prins et al.

(10) Patent No.: US 6,181,774 B1
(45) Date of Patent: Jan. 30, 2001

(54) X-RAY EXAMINATION APPARATUS INCLUDING AN X-RAY FILTER

(75) Inventors: Menno W. J. Prins; Jacobus B. Giesbers; Johannes W. Weekamp, all of Eindhoven; Theodorus J. A. M. Jans, Oss; Wilhelmus J. J. Welters; Nicolaas P. Willard, both of Eindhoven, all of (NL)

(73) Assignee: U.S. Philips Corporation, New York, NY (US)

( * ) Notice: Under 35 U.S.C. 154(b), the term of this patent shall be extended for 0 days.

(21) Appl. No.: 09/316,782

(22) Filed: May 21, 1999

(30) Foreign Application Priority Data

May 22, 1998 (EP) .................................. 98201706

(51) Int. Cl.⁷ ...................................... G21K 3/00
(52) U.S. Cl. .......................................... 378/159; 378/158
(58) Field of Search ................... 378/158, 159, 378/156

(56) References Cited

U.S. PATENT DOCUMENTS

| | | | |
|---|---|---|---|
| 5,099,134 | 3/1992 | Hase et al. | 250/505.1 |
| 5,625,665 | 4/1997 | Fokkink et al. | 378/156 |
| 5,666,396 | 9/1997 | Linders et al. | 378/156 |
| 5,966,426 | * 10/1999 | Marra et al. | 378/159 |

* cited by examiner

*Primary Examiner*—Craig E. Church
(74) *Attorney, Agent, or Firm*—Dwight H. Renfrew

(57) ABSTRACT

An X-ray examination apparatus of this invention comprises an X-ray source, an X-ray detector and an X-ray filter which is located between the X-ray source and the X-ray detector. The X-ray filter includes filter elements, notably capillary tubes, and the X-ray absorption of separate filter elements can be controlled by controlling a quantity of X-ray absorbing liquid in the respective filter elements. The quantity of X-ray absorbing liquid in the individual filter elements is controlled by way of electric voltages applied to the individual filter elements.

The filter elements are formed as spaces between deformed foils which are arranged in a stack which is expanded in the direction transversely of the foils. Adjacent foils are locally attached to one another along seams. The stack is arranged between rigid plates and buffer elements are provided between the rigid plates and the stack. The buffer elements are contractable in the direction transversely to the direction of expansion of the stack. The shape of the cross-section of the capillary tubes is dependent on the ratio of the width of the seams to the spacing of the seams.

11 Claims, 3 Drawing Sheets

X-RAY EXAMINATION APPARATUS INCLUDING AN X-RAY FILTER

BACKGROUND OF THE INVENTION

1. Field of the Invention

The invention relates to an X-ray examination apparatus, comprising an X-ray source, an X-ray detector and an X-ray filter which is arranged between the X-ray source and the X-ray detector and includes a plurality of filter elements whose X-ray absorptivity can be adjusted by adjustment of a quantity of X-ray absorbing liquid within individual filter elements.

2. Description of Related Art

An X-ray examination apparatus of this kind is known from U.S. Pat. No. 5,625,665.

The X-ray examination apparatus forms an X-ray image of an object to be examined, for example a patient to be radiologically examined. The X-ray source irradiates the object by means of an X-ray beam and an X-ray image is formed on the X-ray detector due to local differences in the X-ray absorption within the object. The X-ray filter ensures that the range of brightness values of the X-ray image remains limited. The X-ray filter is adjusted in such a manner that on the one hand parts of the X-ray beam which are only hardly attenuated by the object are slightly attenuated by the X-ray filter and that on the other hand parts of the X-ray beam which are significantly attenuated by the object are transmitted by the filter substantially without attenuation. Because the brightness values of the X-ray image lie within a limited range, the X-ray image can be readily further processed so as to reproduce small details of low contrast clearly.

The X-ray filter of the known X-ray examination apparatus includes a bundle with a very large number of capillary tubes, each of which communicates with the X-ray absorbing liquid by way of one end. The adhesion of the X-ray absorbing liquid to the inner wall of such a capillary tube is dependent on the electric voltage applied to the relevant capillary tube. Specifically, the contact angle enclosed by the X-ray absorbing liquid relative to the inner wall of such a capillary tube is dependent on the electric voltage difference between the inner wall and the X-ray absorbing liquid. When the contact angle is larger than 90°, the X-ray absorbing liquid hardly penetrates such a capillary tube and when the contact angle is smaller than 90°, such a capillary tube is filled with a quantity of X-ray absorbing liquid which is dependent on the magnitude of the electric potential difference. The capillary effect of the capillary tubes in respect of the X-ray absorbing liquid can thus be electrically controlled. The quantity of X-ray absorbing liquid in each of the capillary tubes is controlled on the basis of the electric voltages applied to the capillary tubes.

The manufacture of the X-ray filter of the known X-ray examination apparatus is intricate and hence expensive, because it is very difficult to bundle a very large number of capillary tubes in a regular pattern.

SUMMARY OF THE INVENTION

It is an object of the invention to provide an X-ray examination apparatus which includes an X-ray filter that can be more readily manufactured.

This object is achieved by means of an X-ray examination apparatus according to the invention which is characterized in that the X-ray filter includes a stack of deformable foils, individual filter elements are formed by spaces between individual deformable foils, neighboring foils are locally attached to one another, the stack of deformable foils is arranged between rigid plates, the rigid plates are mechanically coupled to the stack of deformable foils, the stack of foils is expanded transversely of the surface of the foils, and a buffer member is provided between the stack of foils and at least one of the rigid plates, said buffer member being contractable parallel to the surface of the foils. Because the stack of foils is expanded transversely to the surface of the foils, for example by stretching the stack of foils transversely to the surface of the foils, spaces are created between neighboring foils between the locations where the foils are attached to one another. As the stack of foils is stretched further, larger spaces are created between the foils until a given maximum size of these spaces is reached. When the stack of foils is stretched very far, the spaces become smaller again. The spaces are preferably formed as capillary tubes which act as filter elements. The X-ray absorptivity of the capillary tubes, being the filter elements, is adjusted by adjustment of the quantity of X-ray absorbing liquid within said capillary tubes. The stack of foils can be readily stretched, because the stack of foils is arranged between the rigid plates so that the force for stretching the stack of foils can be exerted on the rigid plates. The mechanical coupling ensures that the force exerted on the rigid plates causes a force to act on the stack of foils, transversely to the surface of the foils, so that the foils are pulled apart at the areas where they are not attached to one another. The rigid plates need not be fully inflexible, but should be significantly less readily deformable than the foils. It is thus achieved that the force exerted transversely to the surface of the foils mainly expands the stack of foils, without the rigid plates being deformed or their deformation being at least substantially less. The mechanical coupling is provided by the buffer member. For example, the stack of foils and at least one of the rigid plates are connected to the buffer member to either sides of the buffer member. In response to the force exerted on the buffer member, transversely to the surface of the foils, by the rigid plates, the buffer member is contracted in the direction substantially parallel to the surface of the foils. It is thus achieved that the neighboring foils practically throughout the stack of foils are pulled apart equally far between the spaces where they are attached to one another. Thus, capillary tubes having essentially the same crosssection can be formed between the foils throughout the stack of foils. It is thus achieved that the spatial resolution of the X-ray filter is substantially uniform across the entire surface. Artefacts and/or disturbances in the X-ray image due to the X-ray filter are thus avoided. Preferably, use is made of two buffer members; in that case individual buffer members are provided between the stack of foils and each of the rigid plates so as to achieve a particularly high degree of uniformity of the spatial resolution. The X-ray examination apparatus according to the invention then enables the formation of X-ray images of high diagnostic quality, i.e. small details of low contrast can nevertheless be suitably reproduced in the X-ray image.

The foils are preferably thin foils of a synthetic material. When use is made of flexible foils, the stacked foils can be readily deformed in the direction transversely of the plane of the foils, so that spaces which constitute the filter elements are locally formed between neighboring foils. Preferably, thin foils are used because they hardly absorb any X-rays and hence do not disturb the X-ray image. Flexible, thin, stacked foils can be readily handled; they are notably less vulnerable than preformed thin plates. The foils are preferably thin; for example, foils having a thickness of approximately 5 μm are used. Furthermore, the foils preferably transmit X-rays as well as possible, so that the background absorption of X-rays by the X-ray filter remains low. Moreover, it is advantageous to utilize foils of high mechanical strength which are suitably capable of withstanding X-rays. It has been found that polypropylene sulphone (PPS) is a suitable material for the foils; polyethyleneterephtalate (PETP), polyethylene and polyesters are also suitable foil materials.

The stacked foils are preferably expanded by clamping them transversely to the plane of the foils. As a result, neighboring foils locally move apart at areas where they are not attached to one another. The expanded, stacked foils can be maintained in the expanded condition by keeping them mechanically tensioned. The stacked foils can also be kept expanded by drastically reducing the elasticity of the foils after tensioning, for example by temporary heating or exposure to X-rays or ultraviolet radiation.

These and other aspects of the invention will be described in detail hereinafter.

Shifted patterns of seams result in an alternating structure of seams and capillary tubes. The neighboring foils are locally attached to one another along the seams. Such an alternating structure is very strong and nevertheless much space is effectively used for the capillary tubes.

Foils can be readily locally attached to one another by locally gluing the foils to one another. Preferably, narrow glue seams are provided on the foils; they serve as the seams along which the foils are attached to one another, after which the foils with the glue seams are stacked and possibly pressed. The glue seams can be readily deposited in the form of a structured adhesive layer. The adhesive material in the adhesive layer suitably adheres to the foils. The adhesive layer has a two-dimensional spatial pattern which constitutes the adhesive seams. When such an adhesive layer is used, it is not necessary to provide a large number of narrow adhesive seams individually on a large number of foils. The stack of locally attached foils can thus be quickly and accurately manufactured for the subsequent formation of the capillary tubes.

The foils can also be locally attached to one another, without using an adhesive, by locally heating the foils under pressure. Such a thermal compression locally fuses neighboring foils more or less. When use is made of polymer, for example plastic foils, the foils are preferably heated beyond the glass transition temperature of the polymer so as to achieve suitable bonding at the areas where the foils are locally pressed onto one another. Preferably, a separating layer which locally counteracts the bonding of neighboring foils is used between the neighboring foils. The separating layer is structured in such a manner that openings remain in the separating layer. The neighboring foils can contact one another, through the free openings, to both sides of the relevant separating layer. When pressure is exerted on the stack of foils with the separating layers between individual foils, the neighboring foils are connected to one another at the areas where they contact one another through the openings in the separating layers. At the areas where the separating layers keep the neighboring foils locally apart, spaces are formed when the stack of foils is pulled apart. For example, the openings are narrow strips forming the seams along which the neighboring foils are fused by thermal compression so that they are attached to one another along said seams.

The pattern of cross-sections of the capillary tubes is determined by the degree of expansion of the stack of foils transversely to the foil surface, the spacing in the direction parallel to the surface of the foils between the seams, the seams along which the foils are attached to one another, and the width of said seams. When the seams in a regular pattern between adjoining foils are approximately three times narrower than their spacing and the stack of foils is expanded only little, a more or less eye-shaped pattern is obtained; when the stack is expanded further, a hexagonal honeycomb pattern arises and, when the stack is expanded even further, a pattern of rectangles having slightly rounded corners is obtained. When a honeycomb pattern is used, it is achieved notably that the expanded stack of foils has a high mechanical strength. When the seams in a regular pattern between adjoining foils are approximately two times narrower than their spacing, a diamond-shaped pattern (with slightly rounded corners) is obtained or a pattern of eyes, depending on whether the stack of foils is expanded more or less. When the seams are much narrower than their spacing and the stack of foils is expanded only little, an eye-shaped pattern of cross-sections of the capillary tubes is formed. The directions of the capillary tubes in the expanded foils are dependent on the directions of the seams relative to one another in the expanded foils. For example, when straight or curved, mutually parallel seams are used, straight and curved capillary tubes are formed, respectively, and when the seams are made to converge towards one another, tapered capillary tubes are formed. Furthermore, use can be made of seams which extend in parallel in pairs whereas individual pairs of seams enclose a small angle relative to one another. In that case filter elements are obtained in the form of capillary tubes which enclose an angle relative to one another. It is thus achieved that practically all X-rays in the X-ray beam pass through respective capillary tubes at the same angle. Thus, an X-ray filter can be formed whose spatial resolution varies hardly between the center of the X-ray filter and the edge of the X-ray filter.

Liquid metals, such as notably mercury and gallium, are suitable for use as an X-ray absorbing liquid. Cesium and rubidium are also suitable materials in this respect. When use is made of gallium or cesium, these metals should be heated to approximately 30° C. so as to be liquified. When rubidium is used, it must be heated to approximately 40° C. for liquefaction. Furthermore, numerous other metal alloys are suitable for use as an X-ray absorbing liquid. Notably alloys containing combinations of the elements potassium, sodium, germanium, lithium, barium, mercury, manganese, bismuth, indium, sulphur, gold, copper or selenium are suitable in this respect, because alloys of these elements can be used so as to form a composition having a melting point below 100° C.

Various methods are available for adjusting the quantity of X-ray absorbing liquid present in the filter elements. The quantity of X-ray absorbing liquid in the individual filter elements can be adjusted notably on the basis of electric voltages applied to the filter elements, which means that an electric potential difference exists between the walls of the filter elements and the X-ray absorbing liquid. Such methods are known, for example from the U.S. Pat. Nos. 5,625,665 and 5,666,396 WO 96/13040 (PHN 15.044) and WO 97/03450 (PHN 15.378).

The metal tracks are preferably formed by a metal layer in the form of strips provided on the parts of the foils which are not connected to one another. For example, the metal tracks are formed by a structured metal layer which also acts as a separating layer. The metal tracks act as electrodes via which the electric voltage is applied to the individual filter elements, being the capillary tubes. The electrically insulating layer ensures that no electric breakdowns occur between the X-ray absorbing liquid and the electrodes. For example, the electrically insulating layer is a dielectric layer. The thickness of the electrically insulating layer preferably does not exceed a value of from a few to 10 μm in order to ensure that the dielectric layer has an X-ray absorptivity which is so low that the electrically insulating layer does not become visible in the X-ray image. On the other hand, the dielectric layer should not be so thick that the response time of the filter element becomes longer than a few tens of ms. The setting of the X-ray filter can thus be readily changed within one second. The setting of the X-ray filter can thus be accurately adapted to different X-ray images in rapid succession; for example, when thirty, sixty or even more X-ray images per second are formed, the filter can be accurately adjusted for the individual images.

BRIEF DESCRIPTION OF THE DRAWINGS

These and other aspects of the invention will be described in detail hereinafter by way of example and with reference to the following embodiments and the accompanying drawing; therein.

DETAILED DESCRIPTION OF THE PREFERRED EMBODIMENT

Figure 1:
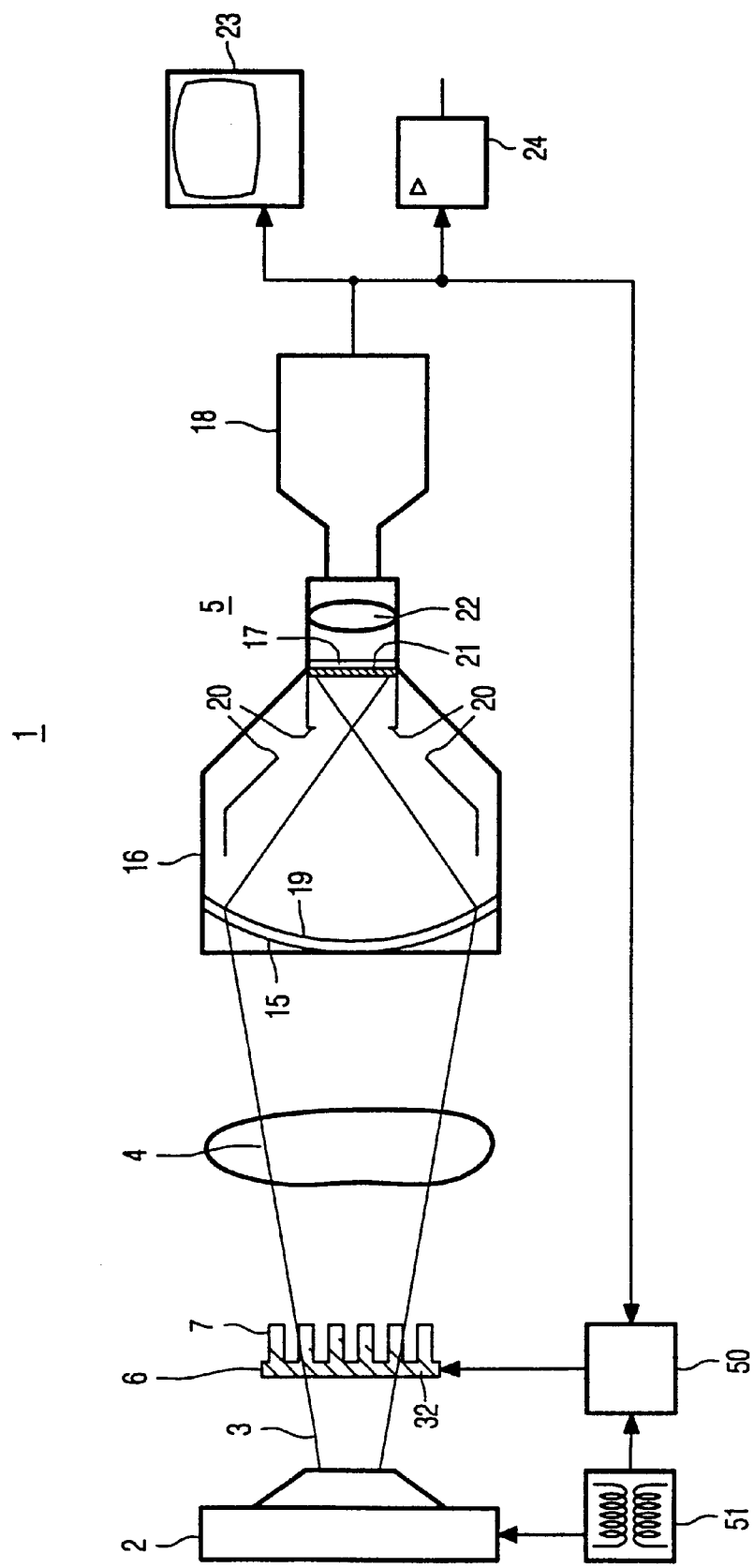
FIG. 1 is a diagrammatic representation of an X-ray examination apparatus in which the invention is used.

FIG. 1 is a diagrammatic representation of an X-ray examination apparatus 1 according to the invention. The X-ray source 2 emits an X-ray beam 3 for irradiating an object 4. As a result of differences in the absorption of X-rays in the object 4, for example a patient to be radiologically examined, an X-ray image is formed on an X-ray-sensitive surface 15 of the X-ray detector 5 which is arranged so as to face the X-ray source. A high-voltage supply 51 supplies the X-ray source 2 with an electric high voltage. The X-ray detector 5 of the present embodiment is an image intensifier pick-up chain which includes an X-ray image intensifier 16 for converting the X-ray image into a light image on an exit window 17 and a video camera 18 for picking up the light image. The entrance screen 19 acts as the X-ray-sensitive surface of the X-ray image intensifier which converts incident X-rays into an electron beam which is imaged on the exit window by means of an electron optical system 20. The incident electrons generate the light image on a phosphor layer 21 on the exit window 17. The video camera 18 is coupled to the X-ray image intensifier 16 by means of an optical coupling 22, for example a lens system or an optical fiber coupling. The video camera 18 derives an electronic image signal from the light image, said signal being applied to a monitor 23 in order to make the image information in the X-ray image visible. The electronic image signal can also be applied to an image processing unit 24 for further processing.

Between the X-ray source 2 and the object 4 there is arranged an X-ray filter 6 for local attenuation of the X-ray beam. The X-ray absorptivity of individual filter elements 7 of the X-ray filter 6 is adjusted by means of an adjusting unit 50. The adjusting unit 50 is coupled to the high-voltage supply 51, so that the X-ray filter 6 can be adjusted on the basis of the intensity of the X-ray beam 3 emitted by the X-ray source. Furthermore, the adjusting unit 50 is connected to the video camera. The X-ray filter can thus be adjusted on the basis of the electronic image signal, i.e. on the basis of image information in the X-ray image.

Figure 2:
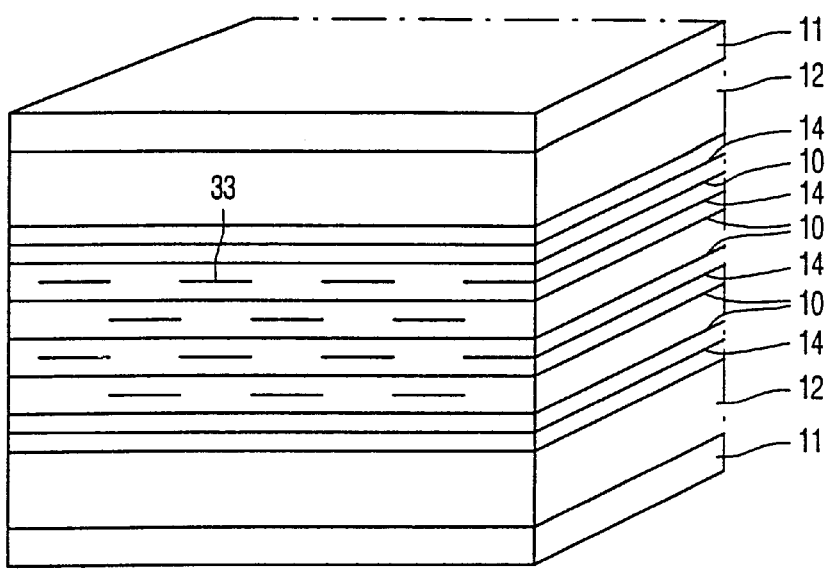
FIG. 2 is a diagrammatic side and front view of an example of stacked foils used to manufacture an X-ray filter.

FIG. 2 is a diagrammatic side and front view of an example of stacked foils 10 used to form an X-ray filter. FIG. 2 shows the stack of flat, approximately parallel foils 10, which extend perpendicularly to the plane which is shown in a front view in the drawing. A respective structured adhesive layer 14 is provided each time between neighboring foils. The adhesive layer comprises, for example adhesive strips which extend perpendicularly to the plane of drawing and are always arranged between neighboring foils. The stack of foils is arranged between two more or less rigid plates 11. The deformability of the rigid plates is far less than that of the foils and the adhesive layers. Buffer members 12 are provided between each of the rigid plates and the stack of foils 10. The rigid plates are connected to the respective buffer members 12, each of the buffer members being connected to the stack of foils. For example, each of the buffer members is connected to the respective extreme (lower and upper) foil in the stack, for example by means of an adhesive layer 14. The neighboring foils are locally attached to one another by compressing the stack of foils with the intermediate adhesive layers in the direction transversely of the plane of the foils; specifically, the neighboring foils contact one another near the adhesive strips 33 while they remain detached from one another between the adhesive strips. The adhesive strips thus form seams 30 whereby neighboring foils are locally attached to one another.

Figure 3:
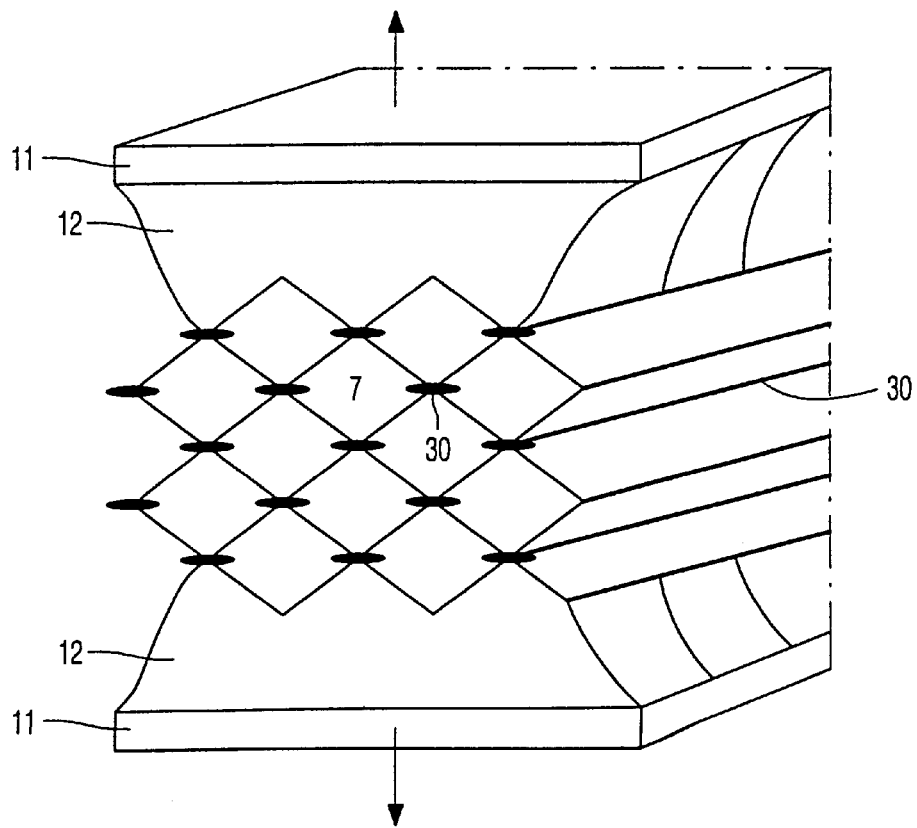
FIG. 3 is a diagrammatic side and front view of an X-ray filter formed by expanding the stacked foils of FIG. 2.

FIG. 3 is a diagrammatic side and front view of an X-ray filter formed by stretching the stacked foils of FIG. 2. The stack of foils 10 has been stretched in the direction of the arrows 40. Stretching is realized, for example by pulling one or both rigid plates 11 in the direction of the arrows. The stretching of the stack of foils locally creates spaces between neighboring foils, i.e. at the areas where they are not attached to one another. Because of the use of adhesive strips, the spaces between the foils are shaped as capillary tubes 7 which extend approximately perpendicularly to the plane of drawing, parallel to the seams 30. The degree of stretching of the stack of foils determines the dimensions of the capillary tubes 7 in conjunction with the dimensions of the seams and the spacing of the seams. Due to the stretching in the direction transversely to the foils, the buffer members are slightly contracted in the direction parallel to the foils. It is thus achieved that foils in the stack are stretched mainly transversely of the foils. The buffer members are preferably buffer layers of acrylate tape.

Figure 4:
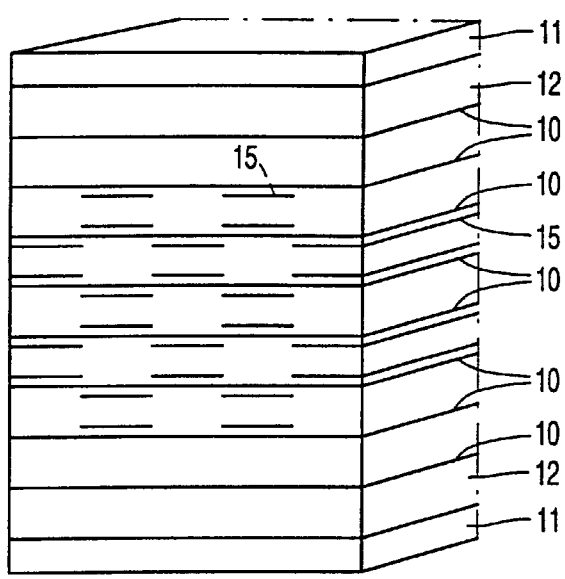
FIG. 4 is a diagrammatic side and front view of another example of stacked foils used to manufacture an X-ray filter.

FIG. 4 is a diagrammatic side and front view of a further example of stacked foils used to form an X-ray filter. The individual foils 10 in the stack alternate with structured separating layers 15. Preferably, the separating layers 15 consist of strips of aluminium having a thickness in a range of from approximately 5 to 500 nm; aluminium strips having a thickness of approximately 20 nm are preferably used. When the foils are heated to a value beyond the glass transition temperature under pressure, the neighboring foils are partly fused at areas where no aluminium is present between the neighboring foils. The neighboring foils are locally attached to one another by way of such a thermo-compression treatment. At areas where a strip of aluminium is present between neighboring foils, the foils are not attached to one another by the thermocompression treatment. It has been found that foils having a glass transition temperature in the range of from 70 to 500° C. are very suitable for application of such a thermocompression method.

Figure 5:
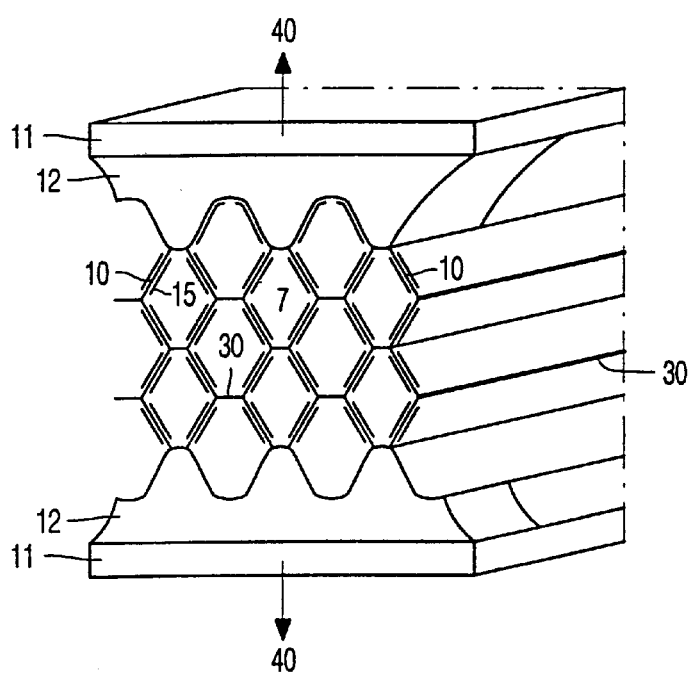
FIG. 5 is a diagrammatic side and front view of an X-ray filter formed by expanding the stacked foils of FIG. 4.

FIG. 5 is a diagrammatic plan view of an X-ray filter formed by stretching the stacked foils of FIG. 4. The stack of foils 10 has been stretched in the direction of the arrows 40. Stretching is realized, for example by pulling one or both rigid plates 11 in the direction of the arrows. The stretching of the stack of foils locally creates spaces between neighboring foils, i.e. at the areas where they are not attached to one another. When use is made of parallel separating strips, approximately parallel seams along which the neighboring foils are attached to one another are formed, for example by thermocompression. Because of such approximately parallel seams, the spaces between the foils are shaped as capillary tubes which extend approximately perpendicularly to the plane of drawing, parallel to the seams. The degree of stretching of the stack of foils determines the dimensions of the capillary tubes in conjunction with the dimensions of the seams and the spacing of the seams. Due to the stretching in the direction transversely to the foils, the buffer members are slightly contracted in the direction parallel to the foils. It is thus achieved that the stretching taking place in the stack of foils is directed mainly transversely of the foils.

Figure 6:
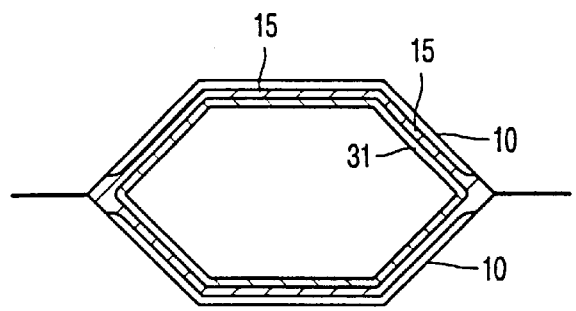
FIG. 6 is a diagrammatic plan view of a detail of one of the filter elements of the X-ray filter of the X-ray examination apparatus according to the invention.

FIG. 6 is a diagrammatic plan view of a detail of one of the filter elements of the X-ray filter of the X-ray examination apparatus according to the invention. FIG. 6 shows notably a cross-section taken transversely to the longitudinal axis of one of the capillary tubes formed by the stretching of a stack of locally attached foils as explained with reference to the FIGS. 2, 3, 4 and 5. The walls of the capillary tubes are formed by the foils 10. A conductive layer 15 is provided on the side of the wall 10 which faces inwards. For example, the conductive layer is the same layer as the structured aluminium separating layer 14 used in the example described with reference to the FIGS. 4 and 5. If no separating layer is used, for example as in the example illustrated in the FIGS. 2 and 3, the conductive layer is separately provided. The conductive layers of individual capillary tubes are electrically insulated from one another in order to ensure that the quantity of X-ray absorbing liquid in the individual capillary tubes can be electrically controlled in a mutually independent manner. An electrically insulating layer is provided on the conductive layer. The dielectric layer ensures that no electric breakdowns occur between the X-ray absorbing liquid in the capillary tube and the condutive layer. Furthermore, the condutive layer is covered with a hydrophobic coating layer 31. The affinity of the hydrophobic coating layer with the X-ray absorbing liquid is low.

All references cited herein are incorporated herein by reference in their entirety and for all purposes to the same extent as if each individual publication or patent or patent application was specifically and individually indicated to be incorporated by reference in its entirety for all purposes.

What is claimed is:

1. An X-ray examination apparatus, comprising:

an X-ray source, an X-ray detector, and an X-ray filter which is arranged between the X-ray source and the X-ray detector, and which includes a plurality of filter elements whose X-ray absorptivity can be adjusted by adjustment of a quantity of X-ray absorbing liquid within individual filter elements, wherein the X-ray filter further comprises:

a stack of deformable foils, wherein individual filter elements are formed by spaces between individual deformable foils arising when the stack of foils is expanded transversely to the surface of the foils, and neighboring foils being locally attached to one another, rigid plates between which the stack of deformable foils is arranged, the rigid plates being mechanically coupled to the stack of deformable foils, and a buffer member provided between the stack of foils and at least one of the rigid plates, said buffer member being contractable parallel to the surface of the foils, wherein individual filter elements are formed by spaces between individual deformable foils in the stack of foils arising when the stack of foils is expanded transversely to the surface of the foils.

2. An X-ray examination apparatus as claimed in claim 1, wherein locally neighboring foils are glued to one another or fused to one another.

3. An X-ray examination apparatus as claimed in claim 2, wherein patterns of seams of individual pairs of neighboring foils which are attached to one another are shifted relative to one another.

4. An X-ray examination apparatus as claimed in claim 1, wherein a structured adhesive layer is provided between separate foils.

5. An X-ray examination apparatus as claimed in claim 1, wherein a structured separating layer is provided between individual foils.

6. An X-ray examination apparatus as claimed in claim 1, wherein the neighboring foils are locally attached to one another along seams, the ratio of the width of the individual seams to the distance between neighboring seams being in the range from 0.1 to 0.4.

7. An X-ray examination apparatus as claimed in claim 1, wherein neighboring foils are locally attached to one another along seams, the width of the individual seams being much smaller than the distance between neighboring seams.

8. An X-ray examination apparatus as claimed in claim 1, wherein the X-ray absorbing liquid is a liquid metal.

9. An X-ray examination apparatus as claimed in claim 1, further comprising metal tracks on individual foils, electrically insulating layers on the metal tracks, and hydrophobic coating layers on the electrically insulating layers.

10. An X-ray examination apparatus as claimed in claim 1, wherein the buffer member is formed using a rubber, a visco-elastic material or an elastomer material.

11. The apparatus of claim 6 wherein the ratio of the width of the individual bonding seams to the distance between neighboring bonding seams is from approximately ¼ to approximately ⅓.

* * * * *